United States Patent [19]

Ammon et al.

[11] Patent Number: 4,867,628

[45] Date of Patent: Sep. 19, 1989

[54] DISPENSER STORAGE SYSTEM

[76] Inventors: J. Preston Ammon, 5074 Lakehill Ct., Dallas, Tex. 75220; William B. Stuhler, 1908 Edgewater, Plano, Tex. 75075

[21] Appl. No.: 144,328

[22] Filed: Jan. 15, 1988

[51] Int. Cl.[4] .................................................. B65G 1/06

[52] U.S. Cl. ....................................... 414/273; 221/88; 414/276; 414/281

[58] Field of Search ................................ 414/268–270, 414/273, 786, 276–283, 661; 221/88, 126, 129

[56] References Cited

U.S. PATENT DOCUMENTS

| | | | |
|---|---|---|---|
| 3,536,194 | 10/1970 | Novak | 414/273 X |
| 3,750,804 | 8/1973 | Lemelson | 414/276 |
| 3,822,025 | 7/1974 | Loos | 414/281 X |
| 4,251,177 | 2/1981 | Neuhaeusser et al. | 414/276 |
| 4,307,988 | 12/1981 | Page et al. | 414/281 X |
| 4,536,120 | 1/1986 | Josserand | 414/280 X |
| 4,595,332 | 6/1986 | Loomer | 414/282 X |
| 4,681,504 | 7/1987 | Welch, Sr. | 414/281 X |
| 4,734,005 | 3/1988 | Blumberg | 414/273 |
| 4,744,198 | 5/1988 | Hood et al. | 414/280 X |

FOREIGN PATENT DOCUMENTS

| | | | |
|---|---|---|---|
| 8606050 | 10/1986 | World Int. Prop. O. | 414/273 |

*Primary Examiner*—David A. Bucci

*Attorney, Agent, or Firm*—Stanley R. Moore; Thomas L. Crisman

[57] ABSTRACT

An article dispensing system comprising a plurality of bins disposed in generally parallel spaced relationship and angulated for facilitating storage and discharge of at least one article contained therein. The system includes an x-y-z positioning mechanism adapted for being disposed adjacent the end of the angulated storage bins. The mechanism is adapted for both loading and retrieving individual ones of the articles into and out of the storage bins. By utilizing a gravity feed system, the mechanical complexity of the x-y-z positioning mechanism is greatly reduced as is the overall cost of the system. Each storage bin is constructed with a lip formed on the lower end thereof for retaining stored articles therein, which retaining lip is inexpensive to fabricate and facilitates simplicity in the mechanical loading and retrieving operation.

2 Claims, 4 Drawing Sheets

DISPENSER STORAGE SYSTEM

BACKGROUND OF THE INVENTION

1. Field of the Invention

The present invention pertains to article vending mechanisms and, more particularly, to a dispenser system incorporating high density, gravity feed, angulated trays for storage of one or more articles therein and a loading/retrieval system therefor.

2. History of the Prior Art

The prior art is replete with vending systems for a myriad of dispensable items. The most common items include cigarettes, candies, chips and soft drinks. Such items have been sold through vending machines for decades and the associated technology is therefore well established. In the main these items comprise fungible goods, in that one bag of potato chips or ice is pretty much like another stored in the same machine. For example, U.S. Pat. No. 3,712,507 teaches an article dispensing apparatus for bags of ice and the like. The apparatus is constructed with at least two drums having a common vertical axis about which the drums rotate. When the drums turn the articles located in the compartments slide along the shelf. As the articles in one drum are dispensed, the second drum is engaged and begins its rotation. This affords the user the opportunity to acquire as many units from drum rotation as needs. With such a construction, however, the articles themselves must be shoved, moved and dropped. They are, therefore, not the kind susceptible to breakage example is the vending apparatus set forth and shown in U.S. Pat. No. 4,621,746. This newspaper vending assembly comprises a drum having an open top and a sliding door on the vertical face. The unit affords convenience to the user by a rotating mechanism of basic construction. A more advanced dispensing system is shown in U.S. Pat. No. 3,780,909 wherein a vending machine for vending packaged products is set forth and described. The technology in this reference requires a higher degree of electrical and mechanical design which again affords access to a plurality of similar packages. More recent developments in vending machine technology has facilitated the dispensing of less fungible commodities. It is now commonplace for a single vending machine to be capable of dispensing several hundred items. When these items are not fungible and comprise over one hundred different categories, rather than five to ten categories, the complexity of the dispensing operation is vastly increased. This situation is readily seen in video cassette dispensing systems. Here the number of tapes stocked in a single system can be on the order of several hundred. The advantage of the system is to provide access to the individual "titles" available therein. The system must therefore be capable of stocking, reloading, and dispensing individual titles which must, by definition, be separately stored within the system and handled gently. This basic machine outline necessitates the utilization of a computer network for locating and handling individual storage areas and tape cartridges. The rewards of a cost effective system which is also reliable, substantially maintenance free and "user friendly" includes a profitable market acceptance in the rapidly growing field of video cassette rentals.

The advent of video cassette recorder (VCR) technology brought with it a revolution in the entertainment industry. VCR cartridges are small, easily handled and contain recorded entertainment such as full length motion pictures. This in conjunction with the fact that the VCR system has been mass produced into a consumer product which is both affordable and reliable has availed the entertainment industry of an incredibly broad market. This market is VCR cassette rentals. The longevity of VCR cassettes permits hundreds of replay operations without serious deterioration of the recorded medium. Thus the investment for a supply of video cassettes can be repaid many times over by re-renting the cassette to multiple consumers. The single most costly aspect of this operation is the personnel charge for operating the VCR rental outlet.

It has been well known that vending machine technology is capable of accommodating the direct sale of goods. Cigarettes, cold drinks and candies are just as easily sold through vending machines as they are at check out stands of convenience stores. For this reason, the profitability of the sale greatly increases as the demand on man hours for the sale decreases. The incorporation of this concept into the VCR cassette rental market was thus an inevitable event. Prior art dispensing systems addressing this market thus provide means for stocking, indexing, handling and dispensing hundreds of video cassettes with almost as many titles. One basic overriding requirement of such a dispensing system is, however, that it be "user friendly". Without consumer acceptance, the dispensing system is worthless. Prior art VCR dispensing systems have been constructed in a variety of configurations, some of which resemble basic vending machine concepts. For example, U.S. Pat. No. 4,598,810 teaches a vending system for TV film and other reusable articles. The user is assigned an identification code number and actuates the apparatus by use of that code number. The articles dispensed are contained therein in a storage bank comprising a generally vertical stack configuration. The cubicles within the stack are constructed for receiving the films to be vended and each cubicle has an upturned stop element at the bottom on the rear side to prevent the film from being moved out from the rear side of the cubicle when the film is returned thereto. The complexity of moving individual units within the stack is clearly set forth therein and it is accomplished through the utilization of a carefully controlled XY motion assembly system including threaded rods and a myriad of interacting elements operated through an electrical control circuit described therein.

Another prior art storage system utilizing a vertical bin array is set forth and shown in U.S. Pat. No. 4,668,150. This 1987 patent to Marvin R. Blumberg teaches a vending machine for video cassettes and an array of storage bins for storing a plurality of containers. Each storage bin is vertically disposed relative to the other and has a bottom with an elongated slot adapted for engaging a controllable arm mounted for relative movement in an XY plane throughout the stack. Each bin supports a single cassette and yet allows the controllable arm to pass through the bin via the elongated slot for the purpose of inserting or removing the cassette relative to the bin. An advantage of the technology disclosed therein is the feasibility of the machine to store a relatively high variety of cassettes compared to the then known cassette vending machines.

As seen above, a common problem in the prior art relative to VCR cassette dispensing systems is the complexity of storage loading and unloading of individual cassette title groups. As shown by the prior art references, much effort is needed to retrieve individual cassettes. It would be an advantage, therefore, to overcome the problems of the prior art by providing a cassette storage system incorporating a self-discharge configuration with a plurality of identical cassettes stored in a common bin area.

The present invention provides such a system by utilizing a high density storage bank of angulated VCR cassette storage trays capable of holding a plurality of cassettes. Each storage tray is disposed in generally parallel spaced relationship with the others in the angulated bank permitting a gravity discharge of a VCR cassette therefrom with others stored therein. In this manner the VCR cassette retrieval and storage system can be fabricated to operate with multiple cassettes of a common title in a very reliable and simplified mode. By securing a series of common cassettes in the angulated trays or bins, behind a short frontal lip, retrieval is effected simply by pivoting the first end of each cassette upwardly. This step is easily reversed for restocking a series of identical cassettes in a common storage bin.

SUMMARY OF THE INVENTION

The present invention relates in general to dispenser storage systems. More particularly, one aspect of the invention comprises a particular dispensing system incorporating a high density, inclined/angulated storage tray bank for multiple cassettes stored in each bin. The system includes a housing and control means within the housing for affording access to one or more individual articles which may be of common identity stored within each angulated bin for dispensing therefrom. All articles may thus be dispensed by access only to the front of the bin array.

The improvement comprises a plurality of storage bins disposed in generally parallel spaced relationship, the bins being constructed at an angle to the horizontal and of varying depth for facilitating storage and gravity feed of one or more articles housed within each bin. An x-y-z positioning mechanism is disposed at approximately the same angle as the storage bins and disposed adjacent the bins along a frontal region thereof. Means coupled to the control means allow selective positioning of the x-y-z mechanism before certain bins. Means are then provided for removing individual ones of the multiple articles from individual bins with the x-y-z mechanism. Means are also provided for dispensing the removed individual articles from the housing.

In another aspect, the invention described above further includes a receiving tray disposed at approximately the same angle as the storage bins and disposed outwardly of the x-y-z mechanism for dispensing and receiving individual articles from and into the x-y-z mechanism as well as from and into selective ones of the angulated bins. The means for powering the x-y-z mechanism includes first and second stepping motors facilitates the x-y movement of the x-y-z positioning mechanism via independent drive chains. The storage bins are disposed at an angle on the order of forty-five degrees and each includes a lower lip upstanding from the storage bin for retaining articles therein. Once the article is pushed above the lip, gravity is used to remove it. The means for removing individual ones of the multiple articles from individual bins with the x-y-z mechanism includes a frame adapted for movement in an x-y plane and a carriage secured to the frame adapted for containing an article therein and transporting the article along a z-axis of movement. The carriage may also be disposed at an angle of on the order of forty-five degrees to permit gravity feed therethrough.

In yet another aspect, the invention described above includes a carriage constructed with a housing having a bottom and top surface. The top surface of the carriage housing has a slot formed therein, with a slide guide received within the slot. A release cam is selectively coupled to the slide guide and an insertion cam is also selectively coupled thereto. The apparatus further includes a z-axis drive mechanism mounted to the housing. The z-axis drive mechanism is coupled to the slide guide and adapted for the rectilinear motion thereof along the z-axis for the insertion and retrieval of multiple articles from each bin. In one embodiment the articles may be VCR cassettes which are stored by separate title in multiple units in each inclined tray.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
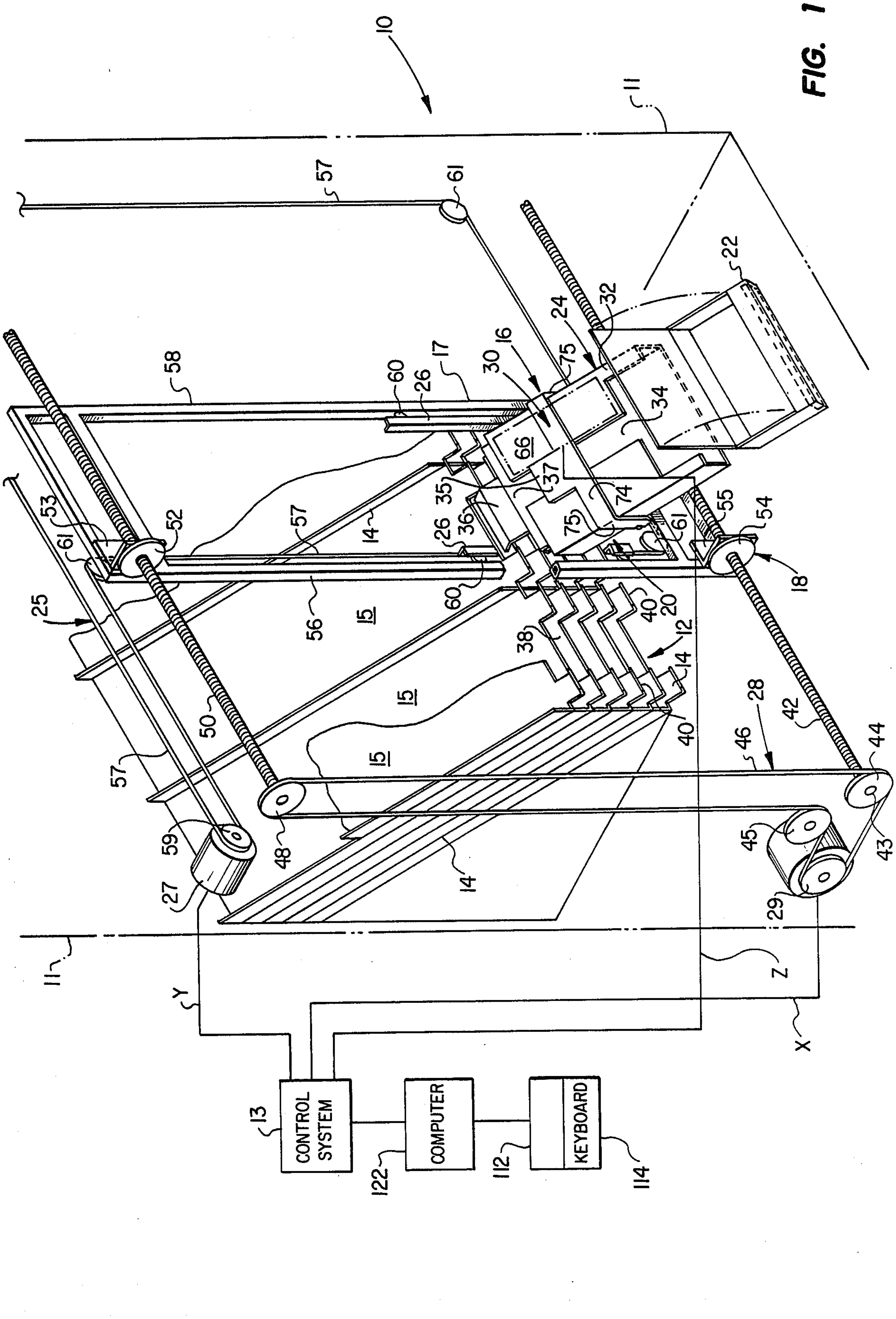
FIG. 1 is a perspective view of an article dispenser storage system constructed in accordance with the principles of the present invention and illustrating an inclined or angulated tray bank adjacent an x-y-z positioning mechanism of approximately the same angle as the tray bank.

Referring first to FIG. 1 there is shown a perspective view of one embodiment of an angulated bin, multiple article dispenser storage system 10 constructed in accordance with the principles of the present invention. The system 10 is secured within a housing 11 to provide a high density, gravity feed system for multiple articles store in each angulated bin. The housing is diagrammatically and fragmentarily represented by phantom lines only and discussed in more detail below. The storage dispensing system 10 comprises a storage bank 12 made up of a plurality of angulated (inclined) storage trays or bins 14 disposed in generally parallel spaced relationship. Each tray 14 includes an elongate body portion 15 adapted for receipt and storage of multiple articles of identical or varying type (such as video cassettes of the same or different titles) to be dispensed by the system 10. Access to the individual or multiple articles within each tray of the bank 12 is provided with an x-y-z positioning mechanism 16, which is controlled by a control system 13, shown diagrammatically herein. The x-y-z positioning mechanism 16 comprises in part a frame 17 and carriage 24 mounted along the frontal region of the tray bank 12. The frame 17 is adapted for bi-directional movement in the x-y plane shown herein while transport carriage 24 mounted thereon facilitates article transfer along the z-axis.

Still referring to FIG. 1, the positioning mechanism 16 further includes an axis drive system 18 and an axis drive system 20, both of which are integrally mounted to the frame 17. The positioning mechanism 16 accommodates location of the carriage 24 before a receiver tray 22 adapted for receiving articles, such as video cassettes, dispensed from and returned to the dispensing storage bank 12. In this manner, tapes can be dispensed, or by leaving one bin vacant, other tapes can be transported to the vacant bin for storage and/or sorting. The positioning mechanism carriage 24 is particularly adapted for transfer of the dispensed articles between receiving tray 22 and the individual trays 14 of the tray bank 12. The carriage 24 includes first and second vertical translation legs 26 mounted to the frame 17 for rectilinear motion thereon. Each carriage leg 26 is secured to the body of the carriage 24 and adapted for precise positioning of said carriage in alignment with the select tray 14.

Referring still to FIG. 1, the drive systems 18 and 20 of this particular embodiment include first and second stepping motor drive trains integrally coupled to the frame 17 and carriage legs 26. An x-axis drive train 28 comprises a pair of threaded rods 42 and 50 constructed with a high helix angle and disposed along the bottom and top regions of the housing 11, driven by a drive chain 46 to define the x-axis therein. The drive train 28 is powered by a stepping motor 29 coupled to the drive chain 46 for defining the x-position of the frame 17. A y-axis drive train 25 comprises a drive chain 57 coupled to the carriage legs 26 to define the y-axis therein. The drive train 25 is powered by a stepping motor 27 integrally coupled with the carriage legs 26 to define the y-position thereof. Collectively, these stepping motor drive trains provide the requisite power and precision for movement of the carriage 24 to the desired x-y position. In this position, the articles.

The carriage 24 includes a z-axis drive system 30, constructed for inserting and retracting individual articles from the individual trays 14 of tray bank 12. A housing 32 thus comprises the body of carriage 24 which is constructed with a guide slot 34 formed therein. The slot 34 defines the z-axis and receives the z-axis drive frame 35 therein. The drive frame 35 extends across the housing 32 and is selectively coupled to an article release cam 36 and an article insertion or transport cam 37. The operation of the cams 36 and 37 are facilitated by the design of trays 14. Each tray includes frontal slots 38 adapted for receiving the outward extension of cam 36 and frontal lip 40 adapted for retaining multiple articles within the tray 14 to prevent them from sliding out once the front article has been released. By storing multiple articles within each tray, the system can dispense the same type of article multiple times with great simplicity in design.

Addressing now the x-axis drive train 28, the high helix angle rod 42 comprises an elongate, threaded body portion coupled at end 43 to a sprocket 44. An idler sprocket 45 is likewise used for aligned positioning of the drive chain 46 driven by the stepping motor 29. The chain 46 couples a second drive sprocket 48 mounted to the second, high helix angle threaded rod 50. The rods 50 and 42 are disposed in parallel spaced relationship and are driven simultaneously by the stepping motor 29 to define the x-axis position of the frame 17 relative to the tray bank 12. Rotation of the rod 50 is translated into rectilinear motion by a high helix angle drive nut 52 which is mounted to an angle bracket 53 secured to the upper end of the frame 17. Likewise, a lower drive nut 54 secured to an angle bracket 55 secured to the lower end of frame 17 whereby the drive nuts 52 and 54 simultaneously translate the rotation of the rods 50 and 42 to the requisite rectilinear motion for the frame 17 relative to the tray bank 12.

Addressing now the y-axis drive train 25 the carriage legs 26 are coupled directly to the drive chain 57 for rectilinear movement upon first and second vertical struts 56 and 58 of the frame 17. The struts are disposed in parallel spaced relationship. The drive chain 57 provides vertical movement of the carriage 24 through the coupling of guide rollers 60 to the struts 56 and 58. A series of idler sprockets 61 are disposed at the upper and lower ends of frame 17 for aligning the drive chain 57. The particular path of the chain 57 can be varied for different applications but in the present invention it is shown to be comprised of a substantially rectangular configuration. Drive motor 27 includes a drive sprocket 59 which powers the drive chain 57 around the idler sprockets 61. In this manner, both the x and y positioning of the carriage 24 can be specifically controlled by a relatively simple stepping motor system.

Figure 2:
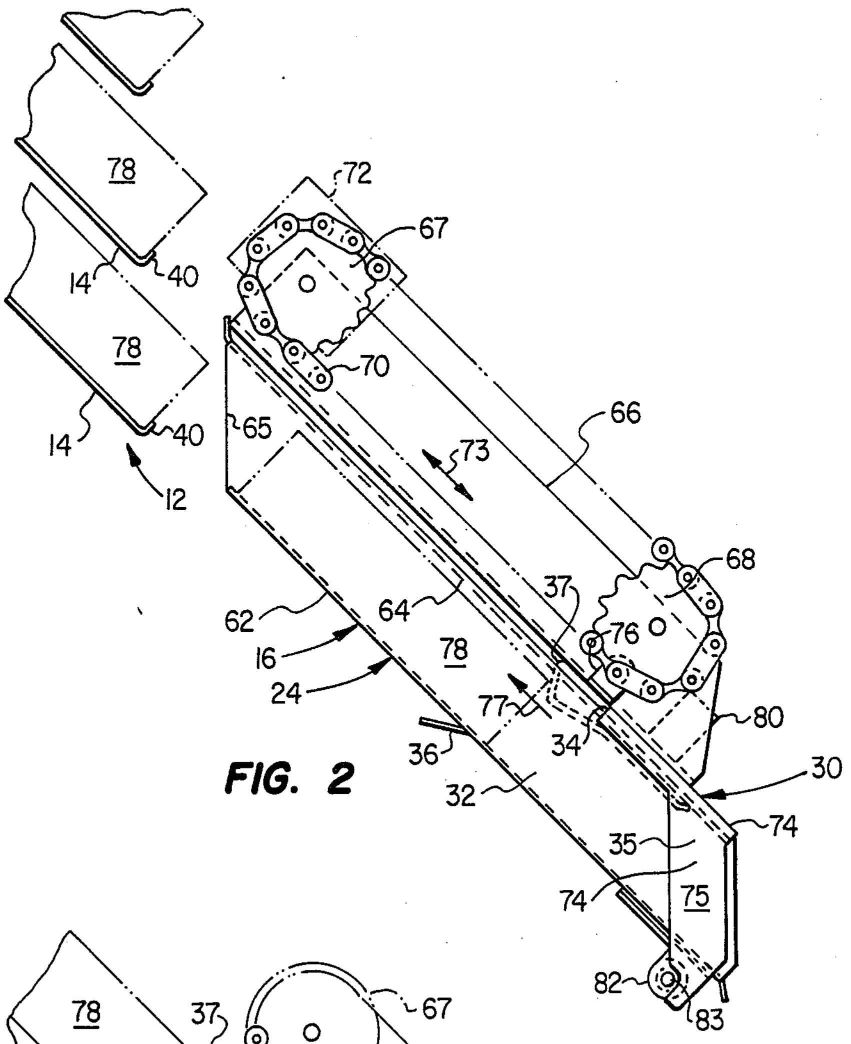
FIG. 2 is an enlarged, side-elevational view of a portion of the x-y-z positioning mechanism adjacent the tray bank.

Referring now to FIG. 2 there is shown an enlarged, side-elevational view of the carriage 24 of the present invention disposed adjacent tray bank 12. Carriage 24 comprises a portion of the x-y-z positioning mechanism 16 and includes housing 32 for receiving articles to be dispensed. The housing 32 is constructed with a bottom 62 and a top 64 in which slot 34 formed (shown most clearly in FIG. 1). The frontal face 65 of the housing 32 is open and formed at an angle generally parallel to the vertical axis of travel for facilitating clearance of articles contained within the trays 14 of the bank 12. The z-axis drive system 30 is shown in more detail herein to include a drive mechanism 66 mounted atop the housing 32 for actuation of the drive frame 35. In FIG. 1 the drive system 66 is shown in phantom for purposes of clarity in view of the fact that a solid representation of this unit would not facilitate adequate illustration of the underlying housing and carriage structure. As is shown in FIG. 2, the drive mechanism 66 includes first and second drive sprockets 67 and 68 respectively. The drive sprocket 67 and 68 are interconnected with a drive chain 70 and powered by a stepping motor 72 also shown in phantom herein for purposes of illustration. The stepping motor 72 may be positioned in various locations along the drive mechanism 66.

Still referring to FIG. 2, actuation of the stepping motor 72 induces movement in the drive chain 70 in either of two directions as reflected by arrow 73. The drive chain is where wings 75 are shown positioned on opposite sides of the housing 32. In this manner, the rectilinear movement of the drive frame 35 is carefully controlled. The chain 70 is coupled to the drive guide 74 by mounting bracket 76. As the chain moves upwardly, mounting bracket 76 causes the slide guide 74 to move upwardly in a direction defined by the guide slot 34 of the housing 32. This movement carries cam member 37 in the direction of arrow 77. An article 78 contained within the housing 32 is then carried in the direction of arrow 77 into the adjacent bin 14. The vertical position of the housing 32 is shown to be slightly above the vertical edge of the lip 40 whereby the movement of the article 78 will clear the lip 40 for insertion into bin 14. This particular drive mechanism 66 further includes means for actuating release cam 36 and transport cam 37. A transport cam solenoid 80 is thus shown herein for providing requisite motion to the transport cam 37. A release solenoid 82 provides select engagement and disengagement of release cam 36 in a manner described in more detail below.

Figure 3:
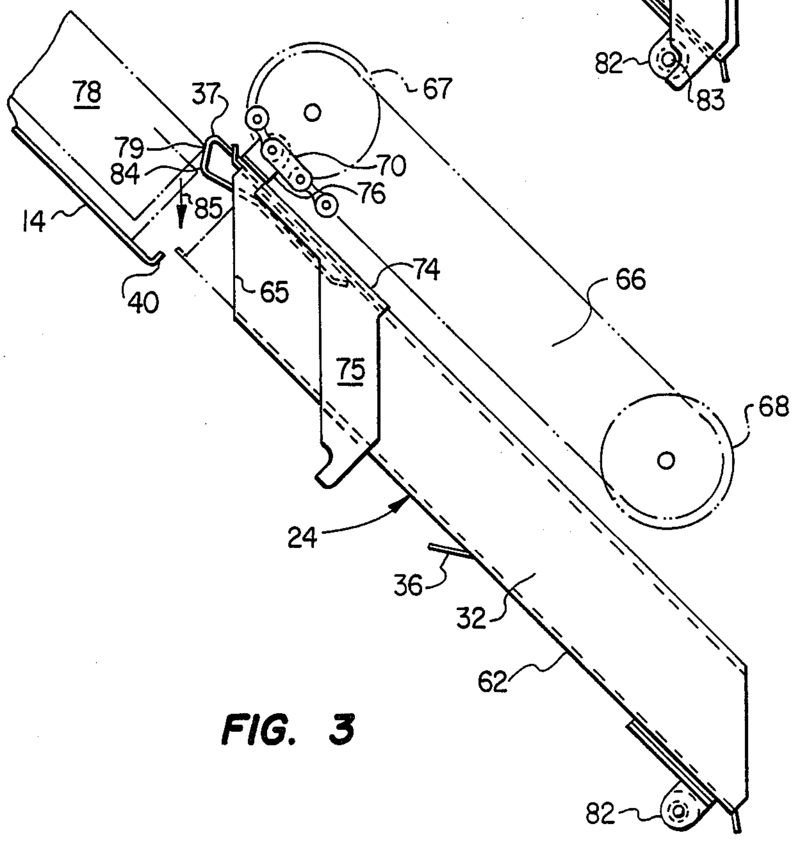
FIG. 3 is a side-elevational view of the x-y-z positioning mechanism of FIG. 2 in a second position of operation.

Referring now to FIG. 3, there is shown a side elevational view of the carriage 24 of FIG. 1 in a first transport position. This transport-insertion mode of generation is adapted for inserting an article 78 into an adjacent tray 14. In this position, the drive system 66 has rotated the chain 70 and the mounting bracket 76 to carry the slide guide 74 toward the end 65 of housing 32. The transport cam 37 is shown engaging the corner 79 of article 78 after it has propelled said article over the lip 40 of tray 14 to afford insertion therein. The force of the transport from the slide guide 74 is sufficient to carry upwardly other articles 78 previously dispensed in the tray 14. It may be seen that the solenoid 82 and release cam 36 remains in the position shown in FIG. 2 because said release cam is actuated only for the release of the article 78 from the bin 14 described in more detail below. The present illustration provides explanation as to the insertion technique whereby the transport cam 37 is integral to the movement of the article 78. It should be further noted that the frontal face 84 of the transport cam 37 is angulated relative to the edge of the article 78 for purposes of facilitating the release of the article 78 once it is transported over the lip 40 of the tray 14. With the aforesaid angle of the frontal face 84 of the cam 37, the article 78 is induced to drop downwardly in the direction of arrow 85 under the influence of gravity. The present invention is constructed with the angulated bin configuration and the angulated cam orientation for maximizing the efficiency of the operation through the utilization of gravity feed in both loading, unloading and transporting of the articles herein.

Figure 4:
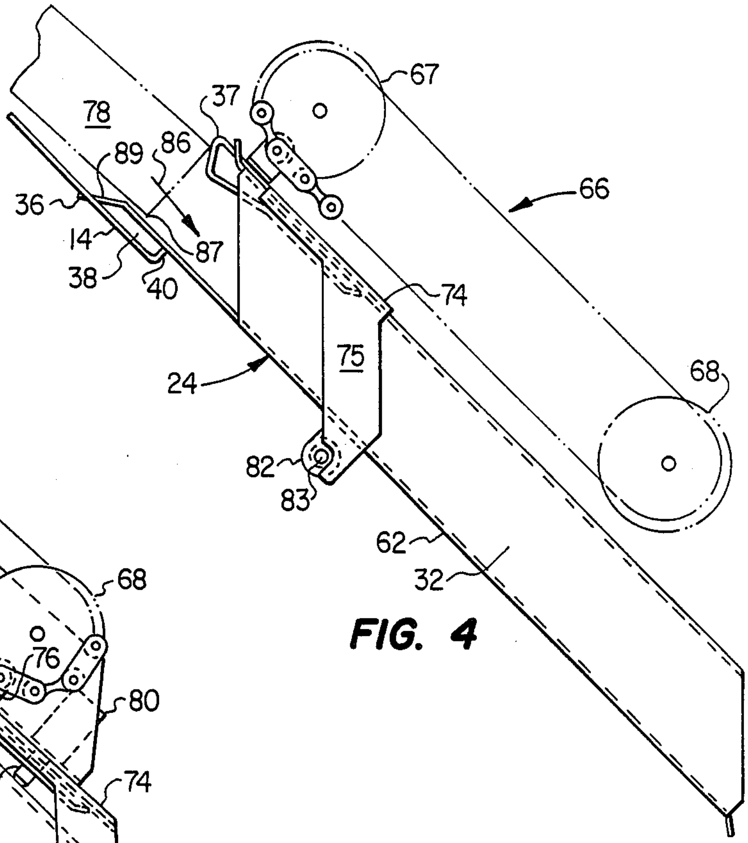
FIG. 4 is a side-elevational view of the x-y-z positioning mechanism of FIG. 2 in a third position of operation.

Referring now to FIG. 4, there is shown the carriage 24 in a second transport position. This second mode of operation is adapted for the release of one of several articles 78 disposed in the bin 40. The release is accomplished under the influence of gravity which greatly facilitates the operation and permits multiple articles 78 to be stored in a single bin 40. The release is obviously accomplished by pivoting the article 78 upwardly over the lip 40 in a manner facilitating its gravity feed in the direction of arrow 86 into the housing 32. The weight of the articles 78 cause them to slide downwardly. It may be seen that the slide guide 74 is in the position shown in FIG. 3 with one modification: actuation of solenoid 82 has engaged the side wing 75 through the extension of pin 83. Release solenoid 82 comprises an integral structure of the release cam 36 which is then carried upwardly along the housing 32 extending into the slotted region 38 (shown most clearly in FIG. 1) for slipping beneath the lower corner 87 of the article 78. Movement of the article 78 into the housing 32 is limited by the cam 37. However, due to the steep angle of the carriage 24 and the tray bank 12, the article 78 will move downwardly in the direction of arrow 86 as the slide guide 74 is retracted into the position shown in FIG. 2. The other articles disposed above the released article 78 are then caught by the lip 40 once the release cam 36 has been retracted. However, the other articles 78 are in the bin 40 for subsequent vending which is a marked advantage in the present invention. With the retraction of the slide guide 74 through rotation of the sprockets 67-68, the cam 37 allows the released article 78 to slide downwardly along the bottom 62 of housing 32 into the position shown in FIG. 2. In this position, the article 78 is retained within the housing 32 by the cam 37 for transport to the receiving tray 22 or another location within the tray bank 12, as described in more detail below.

Figure 5:
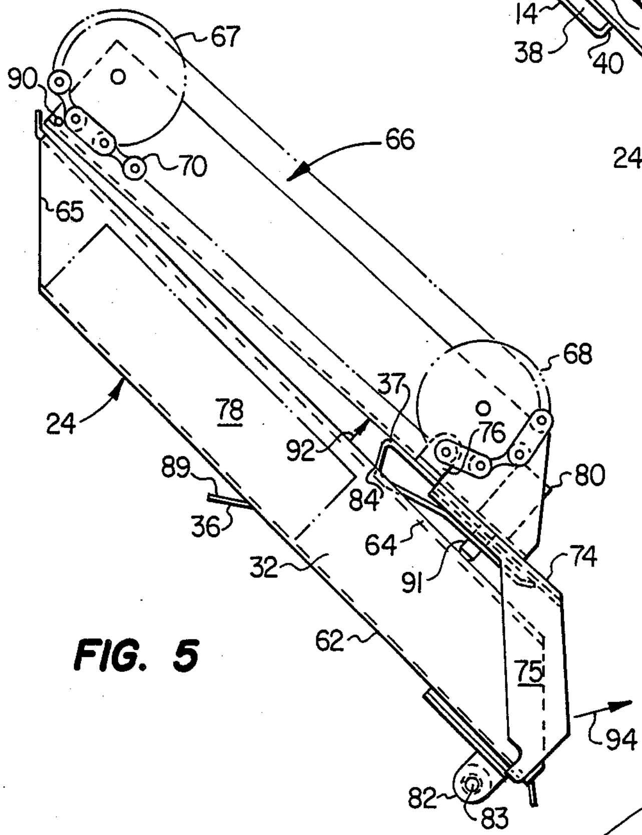
FIG. 5 is a side-elevational view f the x-y-z positioning mechanism of FIG. 2 in a fourth position of operation.

Referring now to FIG. 5 there is shown the carriage 24 in a third transport position. This third mode of operation is adapted for release of the article 78 from, or insertion into the housing 32. When the article 78 is released from the housing 32, it is allowed to slide downwardly under the influence of gravity into the receiver tray 22. The release is afforded by the raising of the cam 37 upwardly in the direction of arrow 92. This function is accommodated by a pivotal mounting of the drive mechanism 66 atop the housing 32. A pivot hinge 90 is shown at the uppermost end of the drive mechanism 66. At the lower, opposite end, a transport solenoid 80 is provided whereby a solenoid shaft or pin 91 bears against the top surface 64 of the housing 32. When actuated, the extension of pin 91 from the transport solenoid 80 lifts the lower end of the pivotal drive mechanism 66 about the pivot hinge 90. This results in the raising of the surface 84 of the cam 37 upwardly in the direction of arrow 92 for releasing the article 78 therefrom. The pivotal actuation likewise causes movement of the slide guide 74. As can be seen herein, the wings 75 pivot upwardly and outwardly in the direction of arrow 94. For purposes of illustration it is seen that the solenoid 82 and the release cam 36 remains stationary during this pivotal actuation because said structure is independent of and separable from the drive mechanism 66. Engagement of the cam 36 by the solenoid 82 as described above is only provided when the wings 75 are in position to engage the solenoid pin 83 during actuation and engagement of the drive system 66. It may thus be seen that the article release cam 36 is a separate, inexpensive, passive slide mechanism that is powered by the same drive mechanism 66 which powers the slide guide 74. This is pointed out for purposes of illustrating the efficiency of operation in the present invention which utilizes drive motors and power trains for multiple applications.

Figure 6:
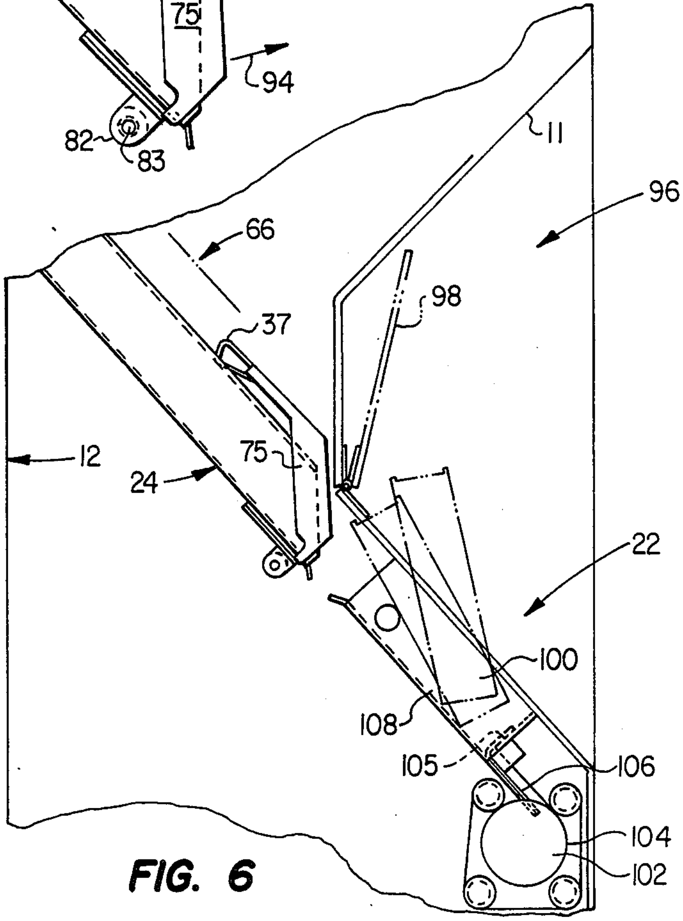
FIG. 6 is a side-elevational view of the x-y-z positioning mechanism of FIG. 1 illustrated adjacent a receiving tray for the handling of dispensed articles.

Referring now to FIG. 6, there is shown a side-elevational, diagrammatic view of the carriage 24 disposed adjacent the receiver tray 22. In this diagrammatic illustration, a portion of the housing 11 comprising an indented customer insert area is shown to form a bay 96 facilitating the opening and closing of the lid 98 covering an article receiving tray area 100. Article 78 can be present in the tray 100 either through deposit from carriage 24, as described above, or by placement therein by a user returning an article to the system 10. In the first case, the requisite mechanical actuation has been completed and the desired result of placing an article 78 in the tray area 100 has been effected. By lifting the lid 98, the system user is able to access the article 78 and remove said article from the bay 96.

Still referring to FIG. 6, when an article is returned to the system 10, it is necessary to insert the article 78 into the carriage 24. This function is provided by a stepping motor 102 which rotates a wound section of formed steel band 104 having a frontal flange 105 to deliver a linear section 106 thereof across the bottom 108 of the tray 100. The utilization of a formed steel band, similar to a steel tape measure, facilitates the use of a small, relatively inexpensive stepping motor 102 and a drive train configuration that is both reliable and low cost. Due to the singular function of this drive train, the loading requirements of shoving a single article 78 upwardly into the carriage 24 minimizes the complexity of construction and reduces the power requirement, weight and associated engineering considerations. As stated herein, the actuation of the motor 102 is only necessary to push a single article 78 into the carriage 24 and is not needed for any other function. The linear section 106 of the wound tape 104 is thus retracted into the wound configuration when not in use, with only frontal flange 105 exposed.

Figure 7:
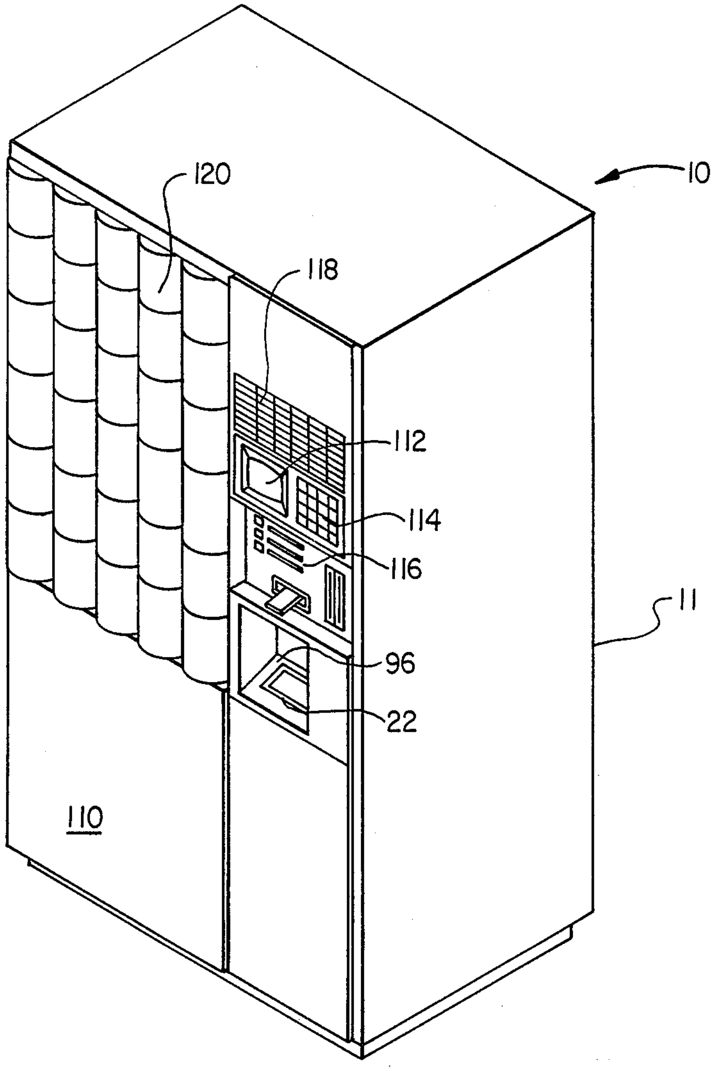
FIG. 7 is a perspective view of one embodiment of an article storage system dispenser housing illustrating the utilization of the present invention.

Referring now to FIG. 7, there is shown a perspective view of the dispensing system 10 of the present invention. The housing 11 of this particular embodiment is of conventional rhomboid configuration typical in the vending machine art. The receiving tray 22 is shown recessed in the bay 96 across the frontal surface 110. The frontal surface of the vending system housing 11 includes a plurality of user access and control elements such as CRT screen 112, keyboard 114, credit card slot 116, data display board 118 and advertising section 120. These aspects of the housing 11 facilitate the user access to the articles 78 stored therein in the tray bank 12. A computer 122 is obviously necessary to coordinate and control the functions of system 10. The computer 122 is housed within the system and coupled to the control system 13, CRT 112 and keyboard 114. It may also perform numerous other user access, data storage/retrieval and operational functions not described herein.

Further, it should be noted that in the present invention, an article 78 can be in the form of video cassettes, discs, books or related items. Video cassette dispensing systems commonly utilize x-y positioning mechanisms. User access electronics that permits a customer to access a desired video tape by utilizing a credit card or similar means of payment in conjunction with the program control circuitry integrated in the system is a part of the current state of the art. The keyboard 114 used herein permits the inputting of information for article selection. In the present invention, the electronic system is not described other than reference to computer 122. It Is the angulated bin configuration of the tray bank 12 in conjunction with the x-y-z positioning mechanism that comprises the spirit and scope of the present invention.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. An improved multiple article dispenser storage system of the type including a housing and control means within said housing for affording access to articles stored therein for dispensing, said improvement comprising:

a plurality of storage bins for multiple article storage therein disposed in generally parallel spaced relationship, said bins being constructed at an angle to the horizontal for facilitating gravity feed of at least one article housed within each angulated bin;

an x-y-z positioning mechanism disposed adjacent said angulated bins along a frontal region thereof;

means coupled to said control means for selectably positioning said x-y-z mechanism before selective angulated bins;

means for removing individual ones of said multiple articles from individual angulated bins with said x-y-z mechanism;

said storage bin for multiple articles including a lower lip upstanding from said storage bin for retaining said multiple articles therein and permitting individual ones to be dispensed therefrom;

said means for removing individual ones of said multiple articles from individual bins with said x-y-z mechanism including a frame adapted for movement in an x-y plane and a carriage secured to said frame adapted for containing an article therein and transporting said article along a z-axis of movement;

means for dispensing said removed individual articles of said multiple articles from said housing; and said carriage including a housing having a bottom and top surface; said top surface having a slot formed therein, and a slide guide received within said slot and top surface adapted for rectilinear motion along said z-axis, a release cam selectively coupled to said slide guide and an insertion cam selectively coupled to said slide guide.

2. The apparatus as set forth in claim 1 and further including a z-axis drive mechanism mounted to said housing, said z-axis drive mechanism coupled to said slide guide and adapted for the rectilinear motion thereof along said z-axis for the insertion and retrieval of articles from said bins.

* * * * *